United States Patent
Rieder et al.

(10) Patent No.: US 12,013,275 B2
(45) Date of Patent: Jun. 18, 2024

(54) METHOD AND MEASURING DEVICE FOR DETERMINING THE VISCOSITY OF A MEDIUM

(71) Applicant: Endress+Hauser Flowtec AG, Reinach (CH)

(72) Inventors: Alfred Rieder, Landshut (DE); Vivek Kumar, Allschwil (CH); Mattia Alioli, Binningen (CH)

(73) Assignee: Endress+Hauser Flowtec AG, Reinach (CH)

( * ) Notice: Subject to any disclaimer, the term of this patent is extended or adjusted under 35 U.S.C. 154(b) by 298 days.

(21) Appl. No.: 17/639,020

(22) PCT Filed: Aug. 3, 2020

(86) PCT No.: PCT/EP2020/071817
§ 371 (c)(1),
(2) Date: Feb. 28, 2022

(87) PCT Pub. No.: WO2021/037492
PCT Pub. Date: Mar. 4, 2021

(65) Prior Publication Data
US 2022/0307886 A1    Sep. 29, 2022

(30) Foreign Application Priority Data
Aug. 30, 2019   (DE) ............... 10 2019 123 368.2

(51) Int. Cl.
*G01F 15/02*   (2006.01)
*G01F 1/84*    (2006.01)
*G01N 11/16*   (2006.01)

(52) U.S. Cl.
CPC ............. *G01F 15/02* (2013.01); *G01N 11/16* (2013.01); *G01F 1/84* (2013.01)

(58) Field of Classification Search
CPC ........... G01F 15/02; G01F 1/84; G01N 11/16; G01N 2009/006; G01N 9/002
See application file for complete search history.

(56) References Cited

U.S. PATENT DOCUMENTS

2001/0039829 A1* 11/2001  Wenger ................. G01F 1/8436
                                                              73/54.41
2005/0229719 A1   10/2005  Rieder et al.
(Continued)

FOREIGN PATENT DOCUMENTS

CN         1894561 A      1/2007
DE     102015120087 A1    5/2017
(Continued)

*Primary Examiner* — Eric S. McCall
*Assistant Examiner* — Timothy P Graves
(74) *Attorney, Agent, or Firm* — Mark A. Logan; Endress+Hauser (USA) Holding, Inc.

(57) ABSTRACT

A method for determining a viscosity of a medium based on damping of an oscillation mode of a measurement tube comprises exciting oscillations of an oscillation mode; detecting a sequence of provisional damping measurement values for the measurement tube oscillation mode; and calculating target measurement values. The influence of the cross-sensitivity of the damping for the flow rate of the medium is corrected by determining rectified damping measurement values that correspond to damping when the medium is at rest and determining viscosity on the basis of the rectified damping measurement values, or correcting the influence of the cross-sensitivity of the damping for the flow rate of the medium by determining provisional intermediate values of a damping-dependent variable, determining rectified intermediate values that correspond to the intermediate values when the medium is at rest, and determining the target measurement values on the basis of the rectified intermediate values.

12 Claims, 2 Drawing Sheets

(56) References Cited

U.S. PATENT DOCUMENTS

2008/0053240 A1\* 3/2008 Henry .................. G01F 15/024
                                                                                       702/45
2022/0244084 A1\* 8/2022 Chatzikonstantinou .....................
                                                                                      G01F 15/02

FOREIGN PATENT DOCUMENTS

| DE | 102016125537 A1 | 7/2018 |
| DE | 102017116515 A1 | 1/2019 |
| DE | 102017129036 A1 | 6/2019 |
| WO | 2018114402 A1 | 6/2018 |

\* cited by examiner

METHOD AND MEASURING DEVICE FOR DETERMINING THE VISCOSITY OF A MEDIUM

CROSS-REFERENCE TO RELATED APPLICATIONS

The present application is related to and claims the priority benefit of German Patent Application No. 10 2019 123 368.2, filed on Aug. 30, 2019, and International Patent Application No. PCT/EP2020/071817, filed on Aug. 3, 2020, the entire contents of which are incorporated herein by reference.

TECHNICAL FIELD

The present invention relates to a method for determining the viscosity of a medium on the basis of the damping of the measurement tube oscillations of a Coriolis mass flow meter or of a density measuring device having an oscillating measurement tube. The invention furthermore relates to a measuring device for carrying out the method.

BACKGROUND

The determination of the viscosity on the basis of the damping of measurement tube oscillations is known per se and, for example, the subject matter of published patent applications DE 100 20 606 A1 and DE 10 2004 014 029 A1. Studies of the inventors of the present patent application have shown that, above a critical flow rate or flow velocity, damping has increasing fluctuations and the mean value of damping increases. Accordingly, damping is subject to influencing variables other than the viscosity of a medium conducted in the measurement tubes. It is therefore the object of the present invention to provide a method and a measuring device that enables reliable viscosity measurement even at large flow rates.

SUMMARY

The method according to the invention serves to determine a target measurement value (X), which comprises a viscosity of a medium or a viscosity-dependent variable of a medium flowing through a measurement tube, on the basis of provisional damping measurement values of at least one oscillation mode of the measurement tube, wherein the damping depends on the viscosity of the medium and has a cross-sensitivity to the flow rate of the medium, wherein the method comprises:
  exciting oscillations of at least one oscillation mode;
  detecting a sequence of provisional damping measurement values for the at least one measurement tube oscillation mode; and
  calculating target measurement values (X);
  characterized in that
  the influence of the cross-sensitivity of the damping to the flow rate of the medium is corrected by determining adjusted damping measurement values, corresponding to the damping in the case of a non-flowing medium, on the basis of the provisional damping measurement values, and determining the target measurement values on the basis of the adjusted damping measurement values, or
  the influence of the cross-sensitivity of the damping to the flow rate of the medium is corrected by determining provisional intermediate values of a damping-dependent variable on the basis of the provisional damping measurement values, determining adjusted intermediate values, corresponding to the intermediate values in the case of a non-flowing medium, and determining the target measurement values on the basis of the adjusted intermediate values.

In a development of the invention, the cross-sensitivity of damping to the flow rate above a critical rate value causes an increase in damping with the flow rate, and wherein the fluctuation of the provisional damping measurement values increases with the flow rate,
  wherein the influence of the cross-sensitivity is corrected on the basis of the fluctuation of the provisional damping measurement values or the provisional intermediate values and/or on the basis of a function that depends on a flow parameter of the medium, wherein the flow parameter comprises a value, especially, a provisional value, of the mass flow rate, the volumetric flow rate, the Reynolds number or the flow rate.

In a development of the invention, the influence of the cross-sensitivity is corrected on the basis of the fluctuation of the provisional damping measurement values or the provisional intermediate values,
  wherein a fluctuation of the provisional damping measurement values or a fluctuation of intermediate values is determined, wherein the intermediate values are calculated on the basis of the provisional damping measurement values;
  wherein a fluctuation-dependent correction term for the provisional damping or intermediate values is determined, with which correction term the provisional damping measurement values or the intermediate values are to be corrected, in order to obtain adjusted damping values or adjusted values;
  wherein the target measurement values are determined on the basis of the adjusted damping values or on the basis of the adjusted intermediate values.

In a development of the invention, the fluctuation-dependent correction term comprises a function of the standard deviation of the provisional damping measurement values or of the intermediate variable.

In a development of the invention, the correction term is a linear function of the standard deviation and is especially proportional to the standard deviation, wherein the adjusted damping values or the adjusted intermediate values are especially obtained by multiplication with the correction term or by subtraction of the correction term.

In a development of the invention, provisional damping mean values of a plurality of damping measurement values that are corrected with the correction term are formed in order to correct the provisional damping measurement values, or intermediate mean values of a plurality of intermediate values that are corrected with the correction term are formed in order to correct the intermediate values.

In a development of the invention, the intermediate values comprise provisional target measurement values, which were calculated on the basis of the damping measurement values without correction for the cross-sensitivity, wherein the adjusted intermediate values especially serve as target measurement values.

In a development of the invention, the target measurement values $X_1$, which are viscosity measurement values or measurement values of the viscosity-dependent variable, can be described as a linear function $X_1 = F(D'_i)$ of adjusted damping values $D'_i$, wherein the intermediate values are determined as a function $Z_i = G(D_i)$ of provisional damping measurement values, wherein the target measurement values are determined as a function $X_1 = H(Z'_i)$ of the adjusted intermediate values, and wherein the following applies:

$$|H(G(D'_i)) - F(D'_i))/F(D_i)| = E, \text{ where } E<0.05, \text{especially}, E<0.02, \text{especially}, E>0.01.$$

In a development of the invention, the influence of the cross-sensitivity is corrected on the basis of a function that depends on the flow parameter.

In a development of the invention, a correction term that is a function of the flow parameter and of a critical value SK of the flow parameter is determined in order to correct the cross-sensitivity, wherein the critical value of the flow parameter corresponds to the value of the flow parameter at the critical flow rate, wherein the function is essentially a linear function of the flow parameter at values of the flow parameter above the critical flow parameter.

In a development of the invention, the target variable comprises the viscosity, the Reynolds number, the mass flow rate, the volumetric flow rate and/or the density of the medium, wherein the mass flow rate, the volumetric flow rate and/or the density are corrected with respect to a cross-sensitivity to the viscosity.

The measuring device according to the invention for determining a target variable of a flowable medium comprises at least one oscillatory measurement tube for conducting a medium, at least one exciter for exciting oscillations of the measurement tube; at least one sensor for detecting oscillations of the measurement tube and for outputting oscillation-dependent signals; and a measuring and operating circuit for driving the exciter and for processing the oscillation-dependent signals; wherein, according to the invention, the measuring and operating circuit is configured to carry out the method according to the invention.

BRIEF DESCRIPTION OF THE DRAWINGS

The invention is now explained in more detail on the basis of the exemplary embodiments shown in the figures. The following are shown.

DETAILED DESCRIPTION

Figure 1:
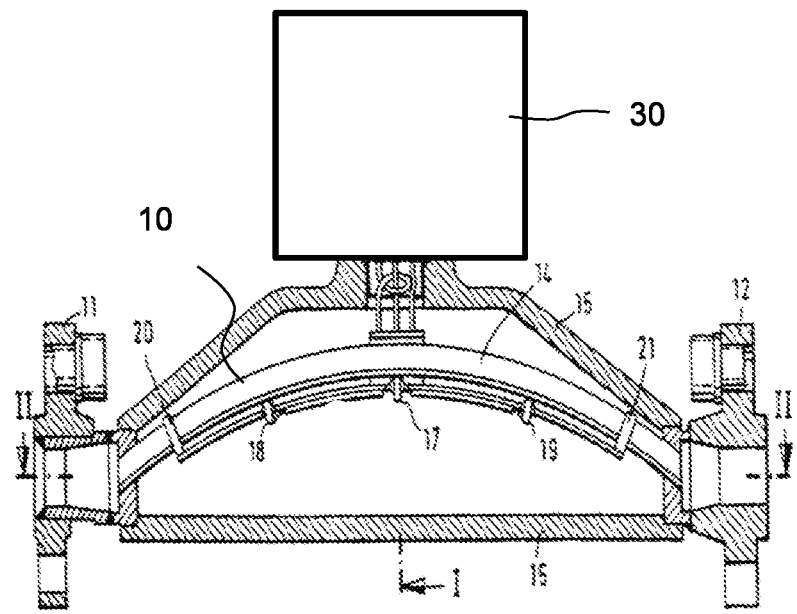
FIG. 1 shows a schematic representation of an exemplary embodiment of the measuring device according to the present disclosure.

The exemplary embodiment of a measuring device 1 according to the invention shown in FIG. 1 comprises an oscillator 10, which comprises a pair of oscillatory measurement tubes 14, which run in parallel and extend between an inlet-side flange 11 and an outlet-side flange 12, wherein the flanges each comprise a flow divider or collector into which the measurement tubes 14 open. The flow dividers are connected to one another by a rigid housing 15 so that oscillations of the flow dividers accommodating the measurement tubes are effectively suppressed in the range of oscillation frequencies of useful bending oscillation modes of the oscillator. The measurement tubes 10 are rigidly connected to an inlet-side node plate 20 and an outlet-side node plate 21, wherein the node plates define oscillation nodes of the oscillator 10 formed by the two measurement tubes 14, and thus largely establish the frequencies of the useful bending oscillation modes. The oscillator 10 is excited to oscillate by an electrodynamic exciter 17 acting between the two measurement tubes 14, wherein the oscillations are detected by means of two oscillation sensors 18, 19 detecting relative movements of the measurement tubes 14 in relation to one another. The exciter 17 is operated by an operation and evaluation circuit 30, wherein the latter also detects and evaluates the signals of the oscillation sensors, in order to determine a density measurement value and possibly a mass flow measurement value. According to the invention, the operation and evaluation circuit 30 is likewise configured to carry out the method according to the invention, i.e., to especially determine provisional damping measurement values of the measurement tube oscillations and to calculate therefrom an adjusted damping measurement value. Unlike what is shown in FIG. 1, the operation and evaluation circuit may also comprise a plurality of spatially separated modules. The damping can thus also be calculated in a remote computing module to which the required raw data are transmitted, for example wirelessly.

Figure 2:
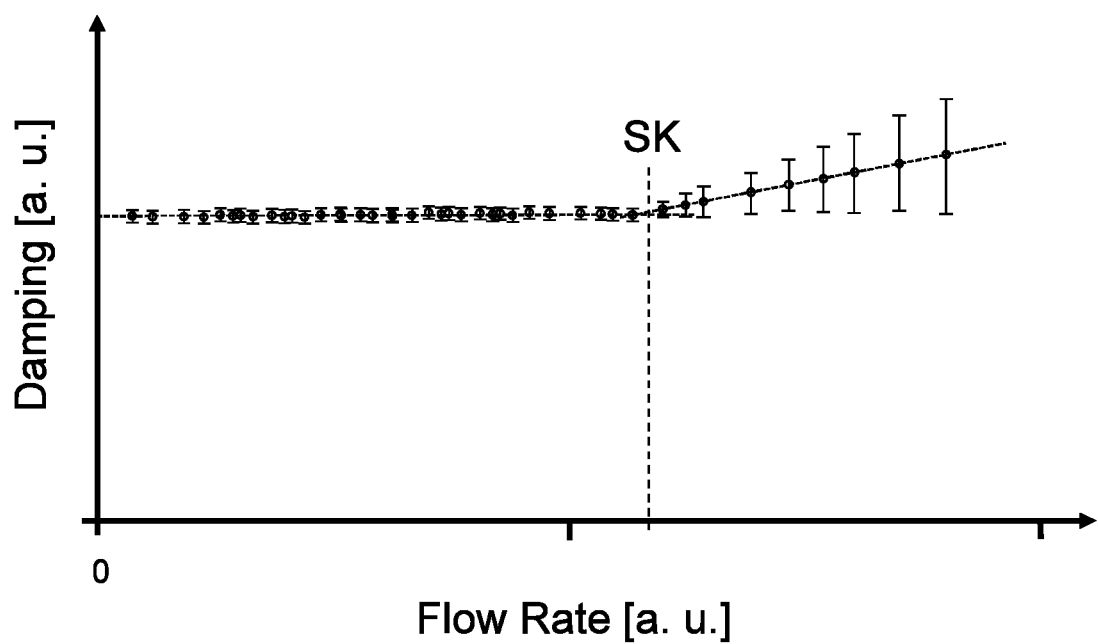
FIG. 2 shows a diagram showing the damping as a function of a flow rate.

FIG. 2 shows typical damping measurement values for the measurement tube oscillations of a Coriolis mass flow meter as a function of the flow rate of a liquid. A damping-proportional observable is, for example, the ratio of excitation current and oscillation amplitude, wherein the oscillation amplitude is to be detected by means of electromagnetic sensors as rate-proportional induction voltage to be normalized with the oscillation frequency. The fluctuation or standard deviation of the damping is constant over a wide flow rate range but increases linearly in a first approximation from a threshold value on as the flow rate increases, wherein the mean value of the damping also increases approximately linearly above the threshold value. For a measuring sensor of the DN 25 size, the threshold value corresponds to a flow rate of a few m/s, for example about 4 m/s. There are now two approaches according to the invention to determine rate-independent or adjusted damping values at flow rates above the threshold value starting from observed damping measurement values. First, a correction term can be determined on the basis of the standard deviation of provisional damping values, in order to obtain an adjusted damping value, as explained in more detail with reference to FIG. 3. Second, when the threshold value of the flow rate is exceeded, a correction term can be determined on the basis of the difference between the current flow rate and the threshold value, as explained in more detail with reference to FIG. 4.

The first exemplary embodiment 100 of the method according to the invention is now explained with reference to FIG. 3. In a first method step 110, a sequence of provisional damping measurement values $\{X'_{1,i}\}$ is detected, for example as a ratio of excitation current and oscillation amplitude. In a second step 120, the standard deviation $\sigma_1(\{X'_{1,i}\})$ of the provisional damping measurement values $\{X'_{1,i}\}$ is determined. In a third step 130, an adjusted damping value $X_1(\{X'_{1,i}\}, \sigma_1)$ is determined, wherein a correction term, which is a function, especially, a linear function, of the standard deviation $\sigma_1$, is, for example, subtracted from a mean value of the provisional damping measurement values. A viscosity value $X_2(X_1)$ can then be calculated 140 on the basis of the adjusted damping value $X_1$. This can be the dynamic viscosity η or a kinematic viscosity v, wherein the latter also includes a density measurement value of the medium. The viscosity is finally also included in further variables $X_N$, for example the Reynolds number Re, which is calculated 150 on the basis of the mass flow rate and the previously determined dynamic viscosity. The Reynolds number can then in turn be included in the correction of the mass flow measurement value, as described, for example, in EP 1 055 102 B1.

Figure 3:
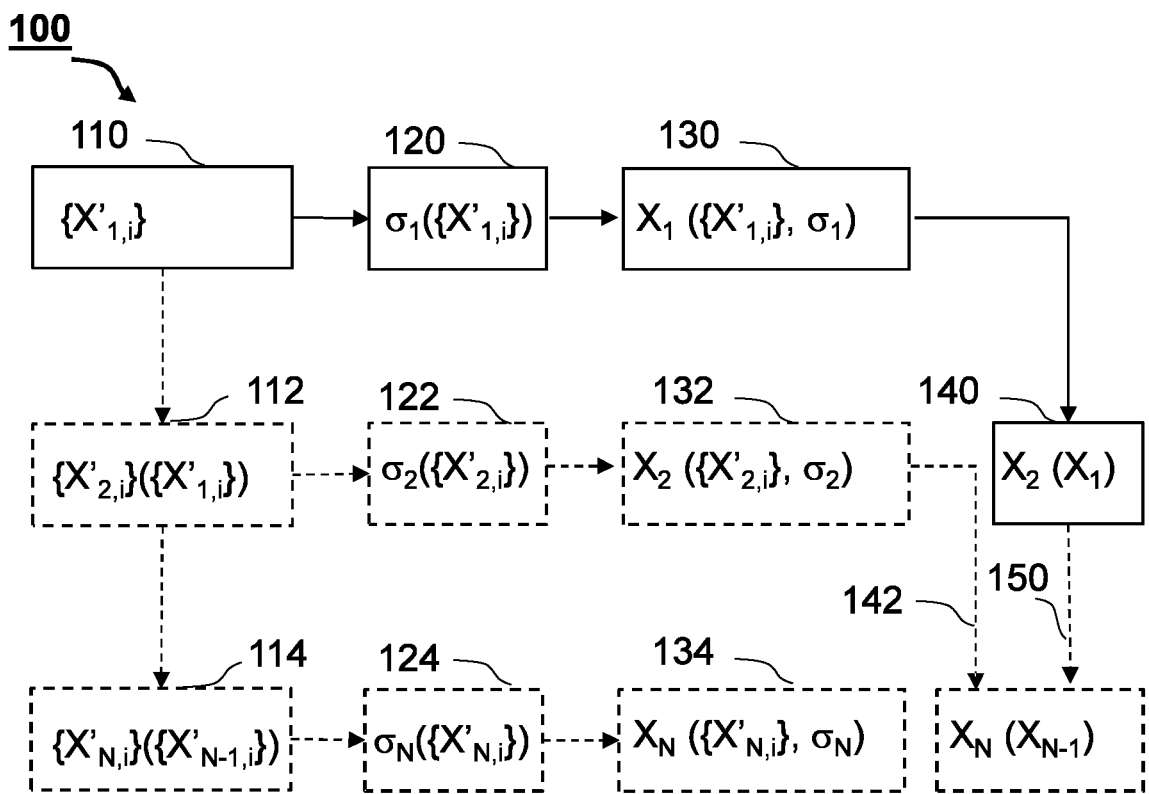
FIG. 3 shows a flowchart of a first exemplary embodiment of the method according to the present disclosure.

The first exemplary embodiment comprises variants, which are likewise shown in FIG. 3. Thus, the provisional damping measurement values $\{X'_{1,i}\}$ can initially be converted 112 into provisional intermediate values of a variable $\{X'_{2,i}\}$ ($\{X'_{1,i}\}$) derived from the damping. In a subsequent step 122, the standard deviation $\sigma_2(\{X'_{2,i}\})$ of the provisional intermediate values $\{X'_{2,i}\}$ is calculated. In a third step 132, an adjusted intermediate value $X_2$ ($\{X'_{2,i}\}, \sigma_2$) is determined, wherein a correction term, which is a function, especially, a linear function, of the standard deviation $\sigma_2$, is, for example, subtracted from a mean value of the provisional intermediate values $\{X'_{2,i}\}$. The adjusted intermediate value can represent the viscosity of the medium, for example. Using the adjusted intermediate value $X_2$, further derived variables $X_N$, for example the Reynolds number Re, can be determined 142. In a further alternative, the provisional intermediate variables $\{X'_{2,i}\}$ can initially be converted 114 into provisional target measurement values $\{X'_{N,i}\}$ from the intermediate variables $\{X'_{2,i}\}$ ($\{X'_{2,i}\}$). In a subsequent step 124, the standard deviation $\sigma_N(\{X'_{N,i}\})$ of the provisional target measurement values $\{X'_{2,i}\}$ is calculated, whereupon an adjusted target measurement value $X_N$ is determined in accordance with $X_N$ ($\{X'_{N,i}\}, \sigma_N$) in a further step 134, wherein a correction term, which is a function, especially, a linear function, of the standard deviation $\sigma_N$ is, for example, subtracted from a mean value of the provisional target measurement values $\{X'_{N,i}\}$. The adjusted target measurement value $X_N$ can represent the Reynolds number Re, for example.

Figure 4:
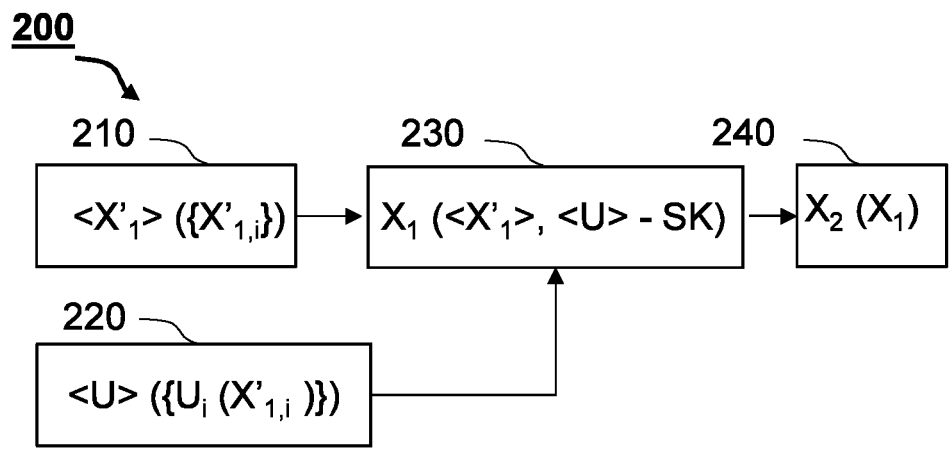
FIG. 4 shows a flowchart of a second exemplary embodiment of the method according to the present disclosure.

The second exemplary embodiment 200 of the method according to the invention is now explained with reference to FIG. 4. In a first method step 210, a sequence of provisional damping measurement values $\{X'_{1,i}\}$ is detected and their mean value $<X'_1>(\{X'_{1,i}\})$ is calculated. In a further step 220, a mean value $<U>$ of values $U_i$ of a flow parameter U is calculated when the provisional damping measurement values $\{U_i (X'_{1,i}\}$ are detected. The flow parameter can especially comprise a flow rate, a mass flow rate or a volumetric flow rate.

In a further step 230, an adjusted damping value $X_1$ is determined from the mean value of the provisional damping measurement values $<X'_1>$, wherein a correction term is subtracted from the mean value of the provisional damping measurement values as a function of the mean value of the $<U>$ of the flow parameter exceeding a critical flow parameter SK, wherein the correction term is a monotonic function of exceeding the critical flow parameter. If a flow rate is selected as the flow parameter, a typical value for the critical flow parameter for a device of the nominal size DN 25 is, for example, 3 m/s to 5 m/s. Specific values are to be determined experimentally depending on the device. On the basis of the adjusted damping value $X_1$, a measurement variable $X_2$ dependent thereon can be determined in a further step 240, for example the viscosity, which is consequently likewise adjusted for influences of the flow parameters. Variations of the second exemplary embodiment arise for the person skilled in the art in accordance with the variations of the first exemplary embodiment discussed above.

The invention claimed is:

1. A method for determining target measurement values, that includes a viscosity of a medium or a viscosity-dependent variable, of a medium flowing through a measurement tube on the basis of provisional damping measurement values of at least one oscillation mode of the measurement tube, wherein damping of the at least one oscillation mode of the measurement tube depends on the viscosity of the medium and has a cross-sensitivity to a flow rate of the medium, the method comprising:
   exciting oscillations of the at least one oscillation mode;
   detecting a sequence of provisional damping measurement values for the at least one measurement tube oscillation mode; and
   calculating the target measurement values;
   correcting an influence of the cross-sensitivity of the damping to the flow rate of the medium by determining adjusted damping measurement values corresponding to a damping of a non-flowing medium, on the basis of the provisional damping measurement values, and determining the target measurement values on the basis of the adjusted damping measurement values, or
   correcting the influence of the cross-sensitivity of the damping to the flow rate of the medium by determining provisional intermediate values of a damping-dependent variable on the basis of the provisional damping measurement values, determining adjusted intermediate values, corresponding to the provisional intermediate values in the case of a non-flowing medium, and determining the target measurement values on the basis of the adjusted intermediate values.

2. The method according to claim 1, wherein the cross-sensitivity of the damping to the flow rate above a critical rate value causes an increase in the damping with the flow rate, and wherein a fluctuation of the provisional damping measurement values increases with the flow rate,
   wherein the influence of the cross-sensitivity is corrected using the fluctuation of the provisional damping measurement values or the provisional intermediate values and/or using a function that depends on a flow parameter of the medium, wherein the flow parameter includes a provisional value, of: a mass flow rate, a volumetric flow rate, a Reynolds number, or a flow rate.

3. The method according to claim 2, wherein the influence of the cross-sensitivity is corrected on the basis of the fluctuation of the provisional damping measurement values or the provisional intermediate values,
   wherein the fluctuation of the provisional damping measurement values or a fluctuation of intermediate values is determined, wherein the intermediate values are calculated on the basis of the provisional damping measurement values;
   wherein a fluctuation-dependent correction term for the provisional damping or intermediate values is determined with which correction term the provisional damping measurement values or the intermediate values are to be corrected to obtain adjusted damping values or adjusted values;
   wherein the target measurement values are determined on the basis of the adjusted damping values or on the basis of the adjusted intermediate values.

4. The method according to claim 3, wherein the fluctuation-dependent correction term includes a function of a standard deviation of the provisional damping measurement values or of the intermediate variable.

5. The method according to claim 4, wherein the correction term is a linear function of the standard deviation and proportional to the standard deviation, wherein the adjusted damping values or the adjusted intermediate values are obtained by multiplication with the correction term or by subtraction of the correction term.

6. The method according to claim 3,
wherein provisional damping mean values of a plurality of damping measurement values that are corrected with the correction term are formed in order to correct the provisional damping measurement values, or
wherein intermediate mean values of a plurality of intermediate values that are corrected with the correction term are formed in order to correct the intermediate values.

7. The method according to claim 3, wherein the intermediate values comprise provisional target measurement values that were calculated on the basis of the damping measurement values without correction for the cross-sensitivity, wherein the adjusted intermediate values serve as target measurement values.

8. The method according to claim 1,
wherein target measurement values $X_i$, which are viscosity measurement values or measurement values of the viscosity-dependent variable, can be described as a linear function $X_i = F(D'_i)$ of adjusted damping values $D'_i$, wherein the intermediate values are determined as a function $Z_i = G(D_i)$ of provisional damping measurement values,
wherein the target measurement values are determined as a function $X_i = H(Z'_i)$ of the adjusted intermediate values, and
wherein the following applies:

$|(H(G(D'_i)) - F(D'_i))/F(D_i)| = E$, where $E < 0.05$.

9. The method according to claim 2, wherein the influence of the cross-sensitivity is corrected on the basis of a function that depends on the flow parameter.

10. The method according to claim 9, wherein a correction term that is a function of the flow parameter and of a critical value of the flow parameter is determined in order to correct the cross-sensitivity, wherein the critical value of the flow parameter corresponds to the value of the flow parameter at the critical flow rate, wherein the function is essentially a linear function of the flow parameter at values of the flow parameter above the critical flow parameter.

11. The method according to claim 1, wherein the target variable comprises the viscosity, the Reynolds number, the mass flow rate, the volumetric flow rate and/or the density of the medium, wherein the mass flow rate, the volumetric flow rate and/or the density are corrected with respect to a cross-sensitivity to the viscosity.

12. A measuring device for determining a target variable of a flowable medium, comprising:
at least one oscillatory measurement tube for conducting a medium, at least one exciter for exciting oscillations of the measurement tube;
at least one sensor for detecting oscillations of the measurement tube and for outputting oscillation-dependent signals; and
a measuring and operating circuit for driving the exciter and for processing the oscillation-dependent signals, wherein the measuring and operating circuit is configured to:
excite oscillations of at least one oscillation mode in the at least one oscillatory measurement tube;
detect a sequence of provisional damping measurement values for the at least one measurement tube oscillation mode; and
calculate target measurement values;
correct an influence of the cross-sensitivity of the damping to a flow rate of the medium by determining adjusted damping measurement values corresponding to a damping of a non-flowing medium, on the basis of the provisional damping measurement values, and determining the target measurement values on the basis of the adjusted damping measurement values, or
correct the influence of the cross-sensitivity of the damping to the flow rate of the medium by determining provisional intermediate values of a damping-dependent variable on the basis of the provisional damping measurement values, determining adjusted intermediate values, corresponding to the provisional intermediate values in the case of a non-flowing medium, and determining the target measurement values on the basis of the adjusted intermediate values.

\* \* \* \* \*